United States Patent [19]

Solomon

[11] Patent Number: 4,983,031

[45] Date of Patent: Jan. 8, 1991

[54] THREE-DIMENSIONAL VOLUMETRIC DISPLAY SYSTEM

[76] Inventor: Dennis J. Solomon, P.O. Box 289, Yarmouthport, Mass. 02675

[21] Appl. No.: 218,581

[22] Filed: Jul. 13, 1988

[51] Int. Cl.5 .............................................. G03B 21/00
[52] U.S. Cl. ...................................... 353/10; 353/122; 353/121
[58] Field of Search .................... 353/10, 122, 121, 98, 353/99, 74–79; 350/120, 126, 144

[56] References Cited

U.S. PATENT DOCUMENTS

| 3,324,760 | 6/1967 | Collender | 353/10 |
| 4,319,805 | 3/1982 | Nicolas | 353/79 |
| 4,391,499 | 7/1983 | Whitlock | 353/122 |

Primary Examiner—Harry N. Haroian

[57] ABSTRACT

The image projector apparatus is the display of the two-dimensional; data-storage format by means of an imaging display which employs a moving screen and a matrix transformation thereby creating a three dimensional reconstruction of the object space.

15 Claims, 7 Drawing Sheets

THREE-DIMENSIONAL VOLUMETRIC DISPLAY SYSTEM

DESCRIPTION

1. Technical Field

The present invention relates generally to visual imaging systems and to three-dimensional visual displays.

2. Background Art

Three-dimensional visual display systems are well-known. Commonly, they employ two distinct images, derived from slightly different perspectives, each visible to the corresponding eye of the observer. This technique is defined as stereoscopic and may be accomplished by optical, chromatic, polarization or holographic means. A lesser-known system which has been the subject of patents and experimentation employs the translocation of a luminous object or screen to achieve the appearance of a three-dimensional image. A simple construction of such a device may employ a light bulb at the end of a string. By rotating the bulb about a central point at sufficent speed, the point source will produce the image of a circle. Techniques which employ light sources within a volume may be defined as volumetric imagers.

U.S. Pat. No. 4,401,368 describes a moving array of light-emitting diodes combined with rotating data stroage and sequencing electronics. U.S. Pat. No. 4,319,805 describes the translocation of a rotating screen about an axis perpendicular to a stationary projector. U.S. Pat. No. 4,343,539 describes the translocation of a projection screen along the x-y-z axises. U.S. Pat. No. 3,636,551 describes a computer-controlled matrix of stationary light sources. U.S. Pat. No. 4,160,973 describes a display where the image data is transferred serially by means of an axially-located optical link and stored in a rotating electronic memory.

While these inventions describe a means to produce a three-dimensional image they do not provide a method for the translation of the image data with sufficent speed and economy to produce a high-resolution, inexpensive, three-dimensional, volumetric imager.

SUMMARY OF THE INVENTION

The present invention discloses a novel and useful method and device for the encoding, storage, reconstruction and display of a three-dimensional volumetric image.

A feature of this invention is the encoding of a three-dimensional object space or image, generated by photographic, holographic, x-ray, magnetic resonance imaging, computerized tomography, computer graphics, radar, or other means into a specific, two-dimensional, data-storage format.

A further feature of this invention is the display of the the two-dimensional, data-storage format by means of an imaging display which employs a moving screen and a matrix transformation thereby creating a three-dimensional reconstruction of the object space.

A further feature is a display enclosure which permits the image to be observed in normal office or home environments, independent of the radial position of the observers.

This invention may be usefully employed for educational, medical, scientific, industrial, defense or entertainment purposes.

These and other objects and features of the invention will be more readily understood by consideration of the following description taken with the accompanying drawings, in which:

FIG. 7 shows the construction of the display enclosure.

DETAILED DESCRIPTION OF THE INVENTION

Figure 1:
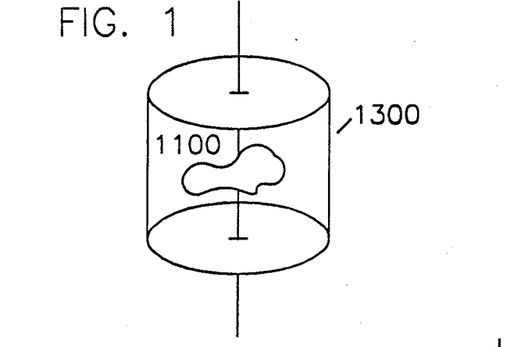
FIG. 1 shows the general method of the invention.
Figure 1A:
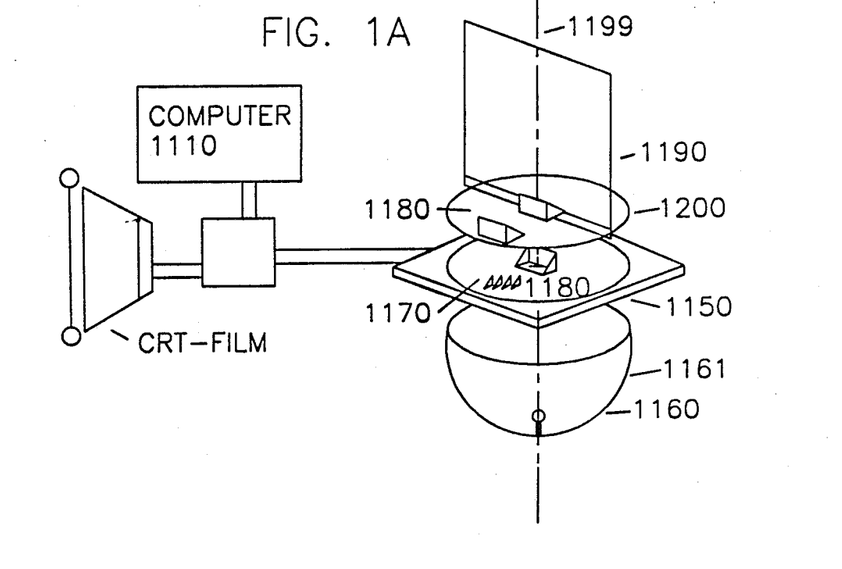

FIG. 1 shows the basic components of the invention. A three-dimensional object 1100 is analysed or created by known methods such as but not limited to video camera, optical, electronic or holographic scanners, radar, x-ray or magnetic resonance tomography, ultrasound, computer graphic software and stored in a digital or other computer using standard three-dimensional coordinate systems. Within the computer 1110, the object data is transformed, using known algorithms, into the standard cylindrical coordinate system.

Figure 2:
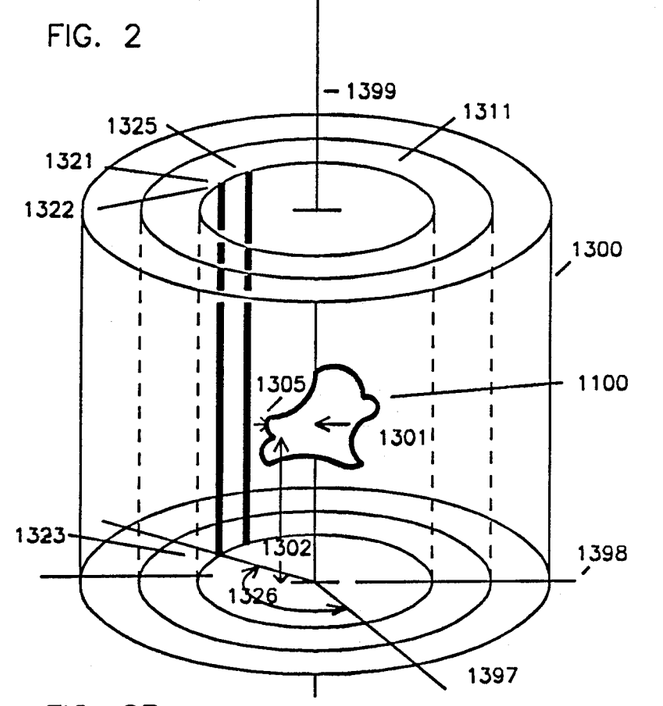
FIG. 2 shows the object space to two-dimensional, data-storage format transformation.
Figure 2A:
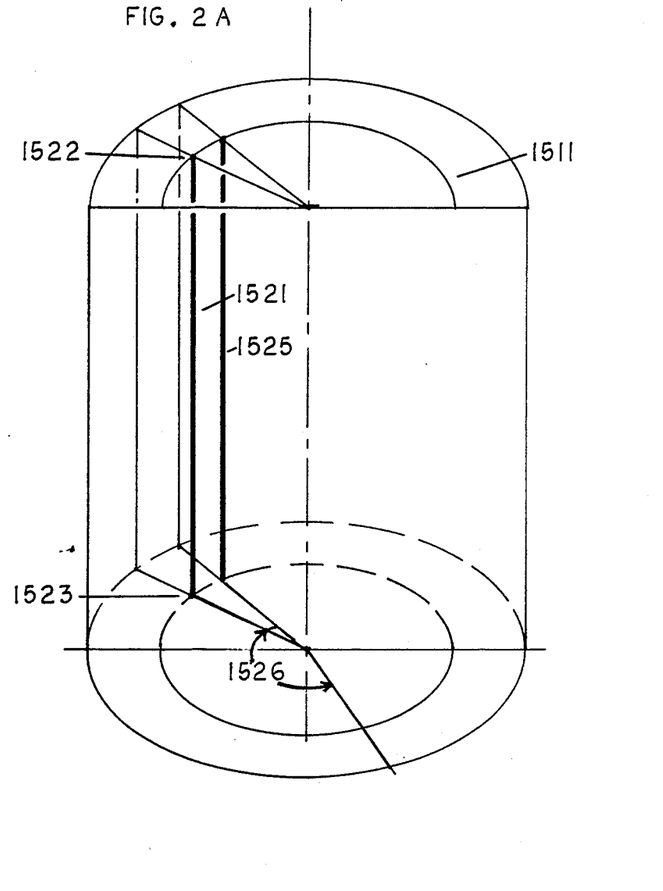
Figure 2B:
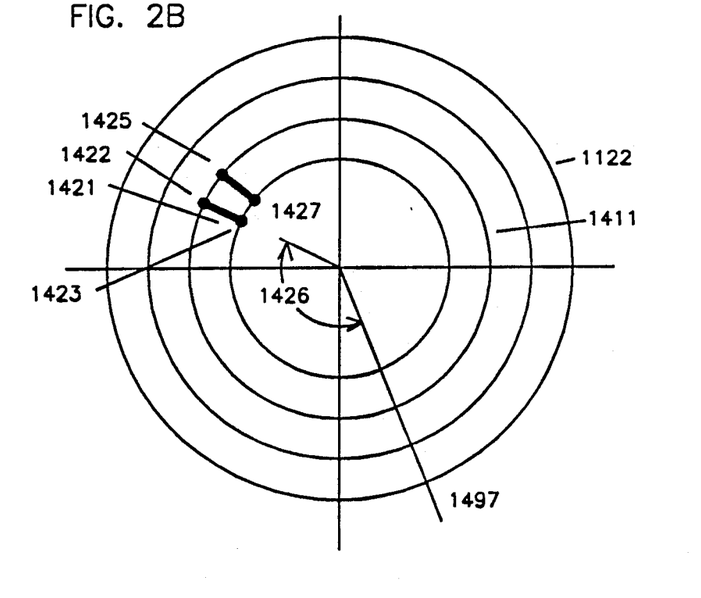

A computational algorithm, following the transformation described in FIG. 2, translates the standard object data into the two-dimesional, data-storage format, hereafter called the 2DDS format.

Using known technologies, the 2DDS format is transferred to a light-modulating medium such as photographic film or masks, optical disks or holographic plates. This transparent, or reflective image of the 2DDS format becomes the data-format, projection slide 1150 in the three-dimensional, volumetric display 1200.

Alternatively, the 2DDS format is (digitally) electronically transferred to an interactive light-modulating device such as a liquid-crystal display, a light-emitting diode array, a plasma display or a cathode-ray storage tube which provides the same function as the data-format, projection slide 1150.

In a general embodiment, the three-dimensional, volumetric display 1200 is comprised of a light source 1160 which is focused on the data-format projection slide 1150 by means of a reflector 1161; a multiplicity of linear scanners 1170 which rotate about a central axis 1199; a system 1180 of projection optics which receive the light from the linear scanners 1170 and project the integrated image onto the display screen 1190; a means of rotating the display screen 1190 about the central axis 1199 in coordination with the rotation of the linear scanners 1170.

The general method of the present invention is the construction of a representation of the three-dimensional object 1100 by displaying on the display screen 1190 successive vertical planes of the object 1100. As the display screen 1190 rotates through 180° the full cylinder of the object space 1100 is presented. When the speed of rotation is in excess of 20 rotations per second the display image appears constant. The linear scanners 1170 rotate with the display screen 1190 and transfer to the projection optics 1180 only the information which corresponds to the appropriate angular position of the display screen 1190.

FIG. 2 shows a graphic representation of the object space to two-dimensional, data-storage format (2DDS).

An object 1100 in object space 1300 is translated into standard cylinderical coordinates where the position of a point 1305 in space is defined by its distance 1301 from the central axis 1399, its altitude 1302 from a reference plane 1398, and its angular dislacement 1303 from a reference radian 1397.

In the present invention, the object space cylinderical coordinate system is transformed into a two-dimensional, data-storage format 1122 where each concentric object space cylinder 1311 defined by its radial distance from the central axis 1399 is compressed and transformed into a coaxial band 1411 on the 2DDS format 1122. Each altitudinal line 1321 on the object space cylinder 1311 becomes a radial or quasi-radial line 1421 on the corresponding coaxial band 1411. The angular reference radian 1397 in the object space 1300 corresponds to the angular reference radian 1497 on the 2DDS format 1122. The relative angular position of the object altitudinal line 1321 to the reference radian 1397 corresponds to the relative angular position of the 2DDS format line 1421 to the reference radian 1497.

To create a display image, the 2DDS format 1122 is transformed and projected onto the display screen 1190 by the projection optics 1180. This reconstruction translates the band line 1421 into the display line 1521 when the scanning and display screen means are positioned to read the band line 1421. Band line 1422, which is positioned at a greater angular distance from the reference radian 1497, would appear as display line 1522 when the scanning and display screen means had been displaced the appropriate angular distance.

The 2DDS format bands may be staggered to encode the full display plane in a radial scan rather than a diametrical one.

Figure 3:
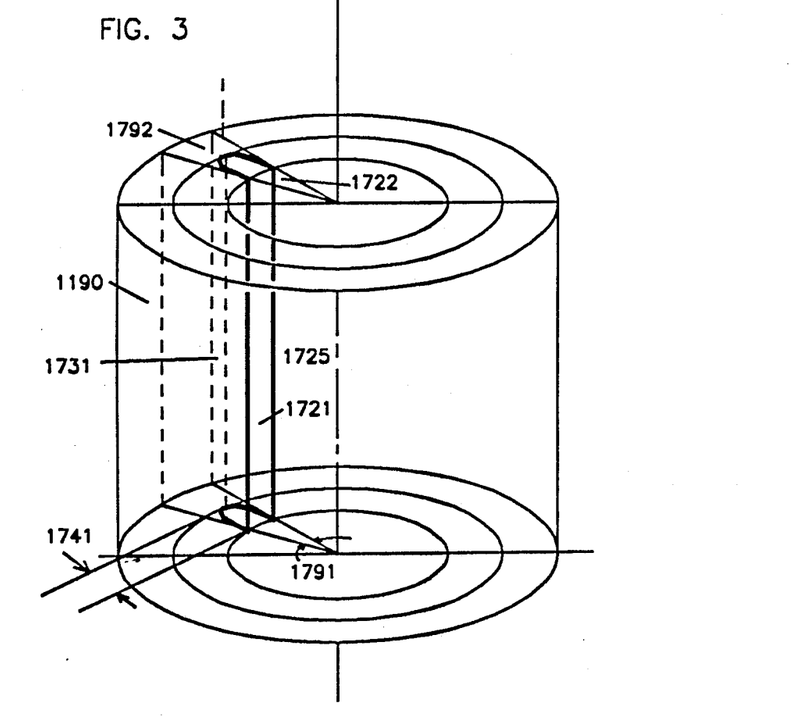
FIG. 3 shows shows a preferred embodiment of the three-dimensional display.
Figure 3A:
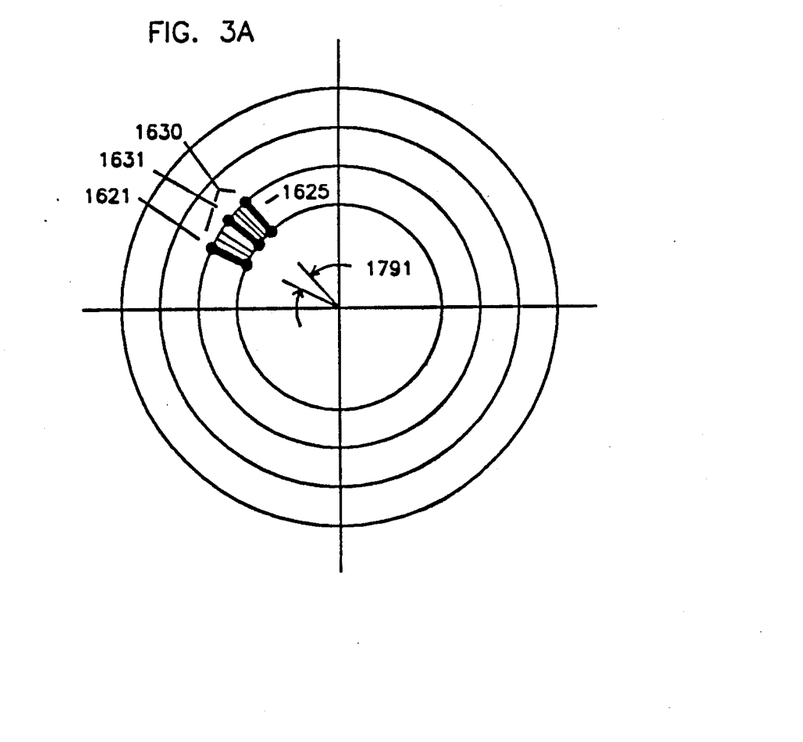

FIG. 3 shows a object-space to two-dimensional, data-storage format encoding which produces a higher resolution image by modifying the method of FIG. 2. This method, referred to as the two-dimensional, translocatable-array, data-storage format or 2DTADS, employs a means to move the display lines 1731 laterally at a sufficent frequency to create an apparent thickness to the display cylinder defined by the display line 1731.

Display line 1731, which represents object space line 1321 on object space cylinder 1311 is displaced a distance 1741 and returned to the original radial position 1721. During this period the display screen 1190 has rotated an angular distance 1791 causing a point on the display line 1721 to describe an arc 1792. When the period is small in relation to the angular displacement 1792, the motion of display line 1721 will appear to describe a small volume.

Data format band line 1621 represents the non-displaced display line 1721. Band line 1622 represents the displaced display line 1731. Band line 1633 represents the non-displaced display line at the same radial distance as 1721 though at a subsequent angular position.

Data-storage format band 1630 encodes a digital or analog displacement signal.

Figure 4:
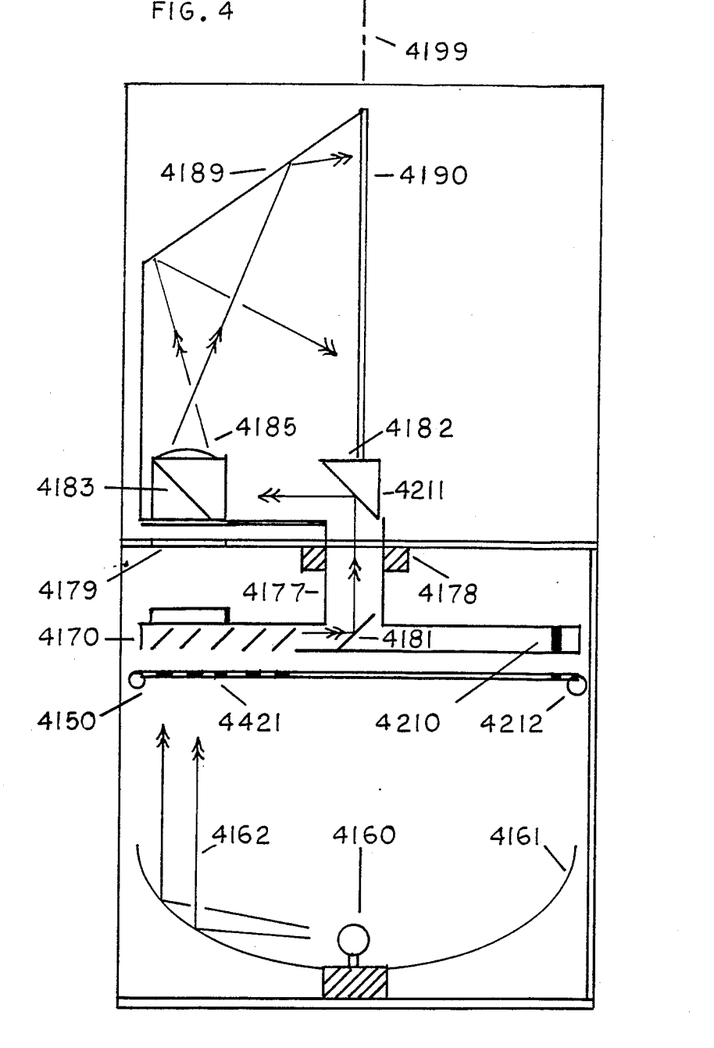
FIG. 4 shows another preferred embodiment of the three-dimensional display.

FIG. 4 shows a cross-section of a preferred embodiment of the present invention. A light beam 4162 from light source 4160 is focused by reflector 4161 into a line coincident with a series of linear scanners 4170. Said reflector 4161 may be fixed or may be a combination of ellipsoidal and parabolic surfaces rotated by motors means 4178 synchronously with lnear scanners 4170. Between the light source 4160 and the linear scanners 4170 is placed the two-dimensional, data-storage format modulator 4150. As described in FIG. 1, the modulator 4150 may be photographic film or an computer-interactive optical modulator such as a liquid-crystal shutter array. The optical modulator 4150 is formatted into a series of bands 4421 corresponding to the 2DDS or 2DTADS method of FIGS. 2 and 3. Data band 4421 is illuminated by light source 4160. Light transmitted through data band 4421 is received by linear scanner 4170, which may be a thin mirrored surface set at 45° to the central axis 4199. The image of data band 4421 is reflected by linear scanner mirror 4170 towards central axis reflector 4181 but offset from the central axis projection 4199 by a distance proportional to its corresponding object space radial distance. From reflector 4181 the data band image is transmitted through hollow shaft 4177 to reflector 4182 to reflector 4183 through projection optics 4185 to reflector 4189 to display screen 4190.

The linear scanners 4170, the reflectors 4181, 4182, 4183, 4189, the projection optics 4185, and the display screen 4190 are attached to hollow shaft 4177 and are rotated by motor means 4178.

The displacement of the two-dimensional display array is achieved by means of displacement driver 4211. This may be a voice-coil or other electro-mechanical means, a piezo-electric crystal or a dielectric optical wedge which is capable of displacing an optical image. The displacement dirver is connected to the displacement signal receiver 4210 which reads the displacement signal 4212 on the data-storage format means 4150.

The display screen 4190 and other moving components may be enclosed in an evacuated vessel.

In another preferred embodiment, the line scanned image is transferred to the projection optics 4183 through a transparent plate 4179.

In another preferred embodiment, the light-modulating data-storage means 4150 is photographic film which is advanced into position by means of a motor mechanism similar to that found in cinema projectors.

Figure 5:
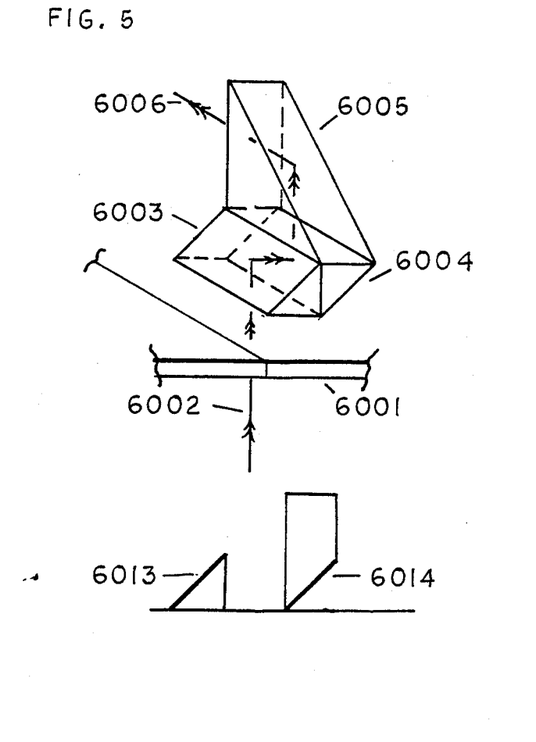
FIG. 5 shows the construction of an element of the linear scanner array.

FIG. 5 shows a single linear scanner element. A light ray 6002 from the light source transverses the data-storage format band 6001 and is reflected by right rectangular prism 6003 to a second right rectangular prism 6004 where the ray 6002 is reflected to a third right prism 6005 and subsequently to the integrating projection optics as ray 6006. The integrating projection optics are a series of cylindrical and projection lenses which expand the band line to the proper aspect ration for display on the rotating screen. When prism 6003 is displaced from prisms 6004 and 6005 the corresponding band line will be displaced laterally. An example in cross-section is shown by prism 6013 and prism group 6014. In a preferred embodiment the linear scanner array is comprised of a multiplicity of single linear scanner elements.

Figure 6:
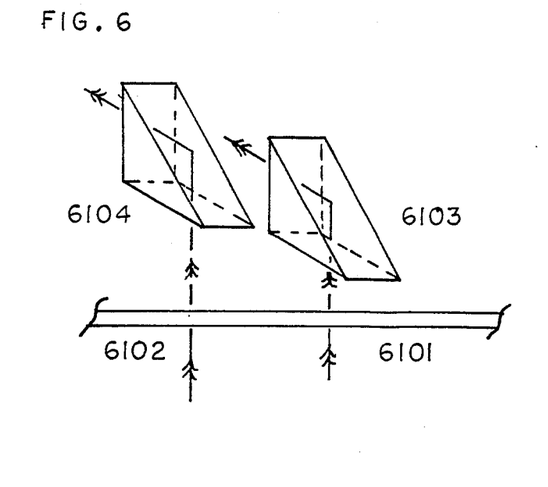
FIG. 6 shows the construction of another embodiment of the linear scanner array.

FIG. 6 shows another preferred embodiment of the linear scanner elements. Right prisms 6103 and 6104 are offset and direct light ray 6102 to the integrating optics. Data-storage format bands 6101 must be offset to maintain the integrity of the display image.

Another preferred embodiment of the scanner element utilises a dove prism to initially rotate the band line. Other embodiments are known and are in the spirit of the present invention. The line-to-rectangular array transformation optics may be constructed using microoptic technology where regions of heterogenous indices of refraction are created in a single substrate. Holographic lenses may also be employed.

FIG. 7 shows a preferred embodiment of the display enclosure. Surface 4201 represents a transparent cylinderical enclosure of the display volume, but may be in the form of a sphere or box. Light ray 4210 represents an external or background light entering the display enclosure from the a position generally opposite that of observer 5401. Arrow 5301 represents the direction of polarization of the polarizing medium affixed to surface 4201, which is 45° to the central axis 5199. This orientation of the direction of polarization 5301 causes the direction of polarization on the opposing surface 5302 to be perpendicular to the original direction 5301. Thus, ray 4210 is polarized in direction 4201 as it enters the display enclosure and is extincted when it interacts with the polarizing means on surface 4302.

Unpolarized light emitted by the display optics is not extincted by the display enclosure and is visible to the observer 5401.

In another preferred embodiment of the display enclosure, the direction of polarization of the display surface 4201 is parallel or perpendicular to the central axis 5199. An optical retarder is affixed to the inner surface of the display enclosure 4201 which introduces a quarter-wave retardation. As ray 4210 passes through the display enclosure it is circularly-polarized by the first surface and plane polarized by the second retarding means perpendicular to the original direction of polarization. Thus, the ray 4201 would be extincted and not visible to observer 5401.

What is claimed is:

1. An improved method for the encoding and display of a three-dimensional image consisting of, the steps of:
    the encoding of a three-dimensional image or object into a data-storage format, said encoding being the transformation of an object space cylinderical cooordinate system to a surface consisting of concentric bands where the radial distance of each point of the object space relative to a central axis defines proportionally the radial distance of concentric band on the data-storage format surface to which it is assigned, where the angular position of each point in the object space relative to a reference radian defines proportionately the angular position on the data-storage format surface of the corresponding point, and where the altitude of each point of the object space relative to a reference plane defines proportionately the position of the corresponding point in the altitudinal line on the data-storage format surface;
    the scanning of each concentric band of the data-storage format surface by a linear scanner positioned generally perpendicular to circumference of the concentric band;
    the transformation of the aforementioned linear scans into a two-dimensional array representative of a plane of the object space, and
    the projection of the aforementioned two-dimensional arrays onto a moving surface such that a representation of the object space is displayed.

2. The method of claim 1 using a display device comprising, in combination: a light source; a means of directing said light source upon a light modulator means; a light modulator means capable of displaying a series of concentric bands comprised of a multiplicity of points; an optical scanning means capable of scanning a line generally perpendicular to the circumference of concentric bands on the light modulator means; an optical projection means which combines the lines of the optical scanning means into a two-dimensional array; an optical projection means which displays the two-dimensional array on a display screen; a means of rotating the scanning means and display screen simultaneously, and a motor means to rotate the scanning means and display screen.

3. A device in accordance with claim 2 where the light source is stationary.

4. A device in accordance with claim 2 where the central axis of of the light-modulator-means-concentric bands, the optical scanning means axis of rotation, and the display screen axis of rotation are colinear.

5. A device in accordance with claim 2 where the optical scanning means and first optical projections which transform the line scans into a two-dimensional array are optical waveguides.

6. A device in accordance with claim 2 where the optical scanning means and first optical projection means are offset reflective surfaces.

7. A device in accordance with claim 2 where the optical scanning means and the first optical projection means are a series of image-rotating prisms, cylinderical lenses and reflective surfaces.

8. A device in accordance with claim 2 where an optical means for the displacement of the projected display array on the display screen is provided, where the magnitude and direction of said displacement is controlled by data encoded on the data-format storage surface.

9. A device in accordance with claim 2 where the display screen is enclosed by a transparent polarizing means, said direction to polarization being at 45° to the central axis of the enclosure.

10. A device in accordance with claim 2 where the display screen is enclosed by a transparent polarizing means and a optical retarding means affixed to the inner surface of the polarizing means, said direction of polarization being constant over the surface of the enclosure and the retarder being oriented so as to cause a 90° rotation of the plane of polarization of all external rays when passing through two surfaces of the retarder.

11. A device in accordance with claim 8 where the projected display array is cyclicly displaced radially and displays object information related to intermediate positions of the display array.

12. A device in accordance with claim 1 where the scanning array consists of a one-dimensional array of opto-electronic or electronic switches which control the emission of light-radiating elements on the rotating display screen.

13. A device in accordance with claim 2 where a means to rapidly change the light-modulating data-storage format surface is provided.

14. A device in accordance with claim 13 where the light-modulating data-storage format means is interactively connected to a digital computer.

15. A device in accordance with claim 13 where the light-modulating data-storage format means is photographic film, said film being divided in frames which may be rapidly changed by a motor means.

* * * * *